(No Model.) 3 Sheets—Sheet 1.
J. C. A. DEAN.
TRUCK.
No. 485,262. Patented Nov. 1, 1892.
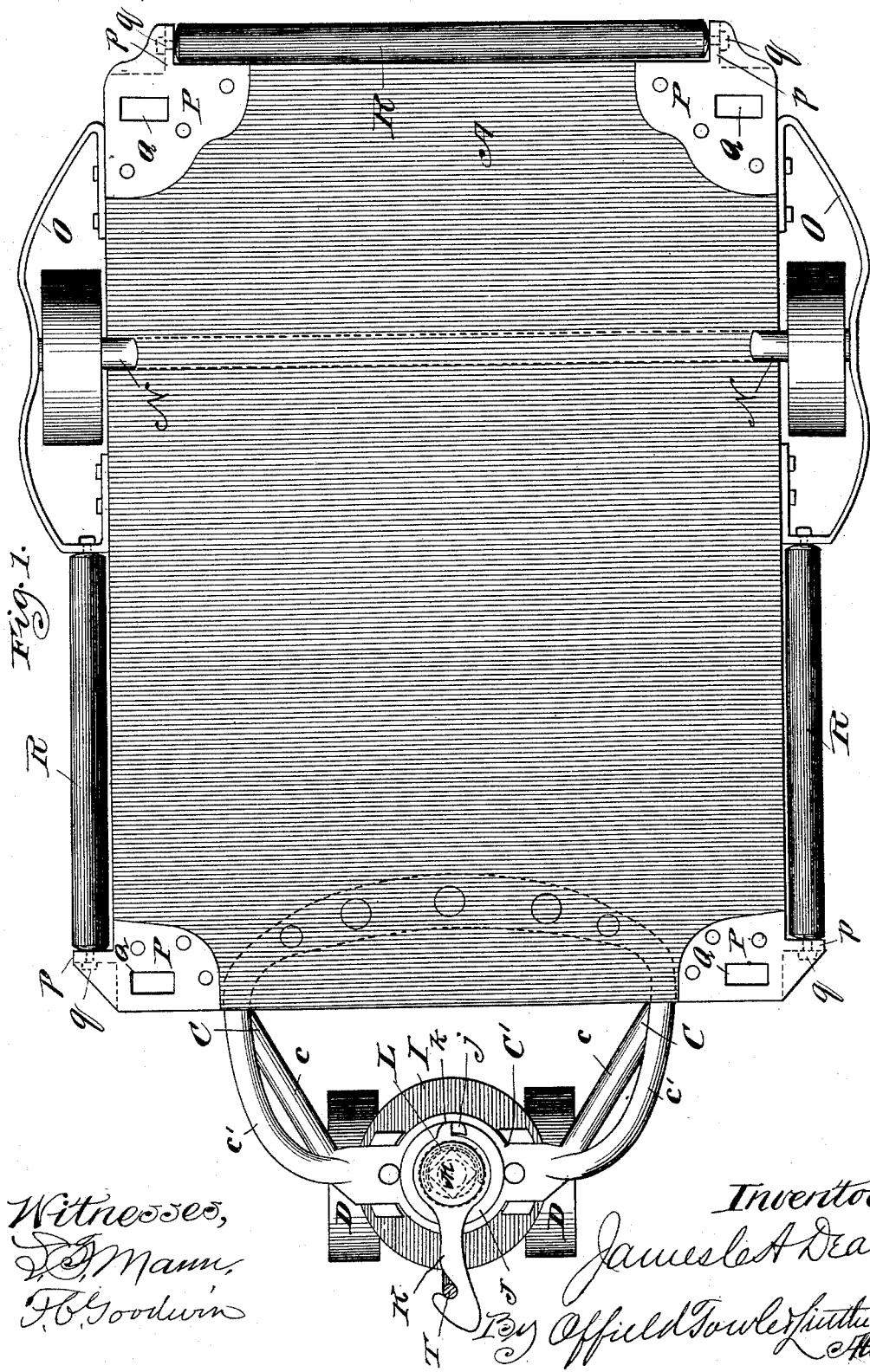
Witnesses,
F. J. Mann,
F. C. Goodwin
Inventor,
James C. A. Dean
By Offield Towle & Linthicum
Attys.

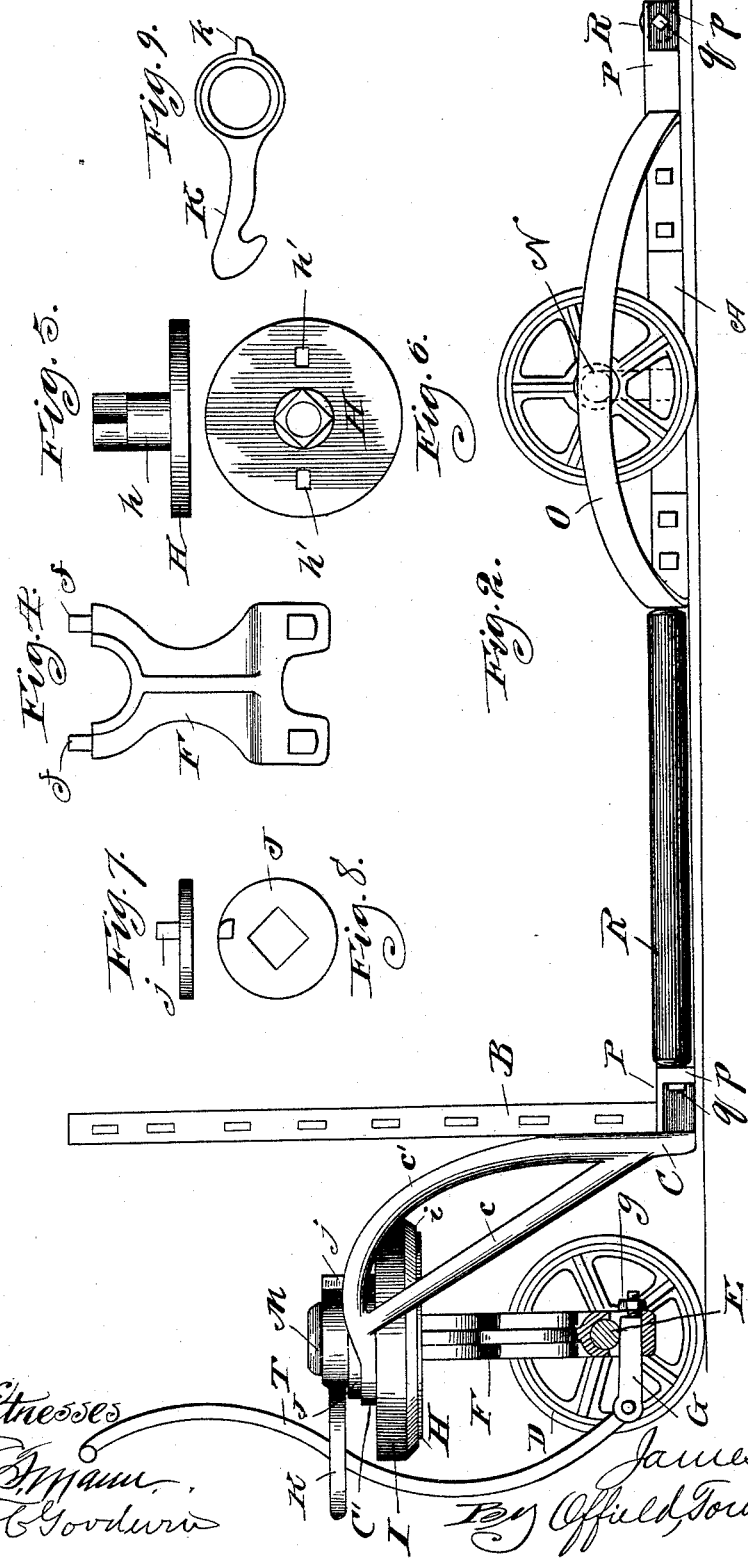

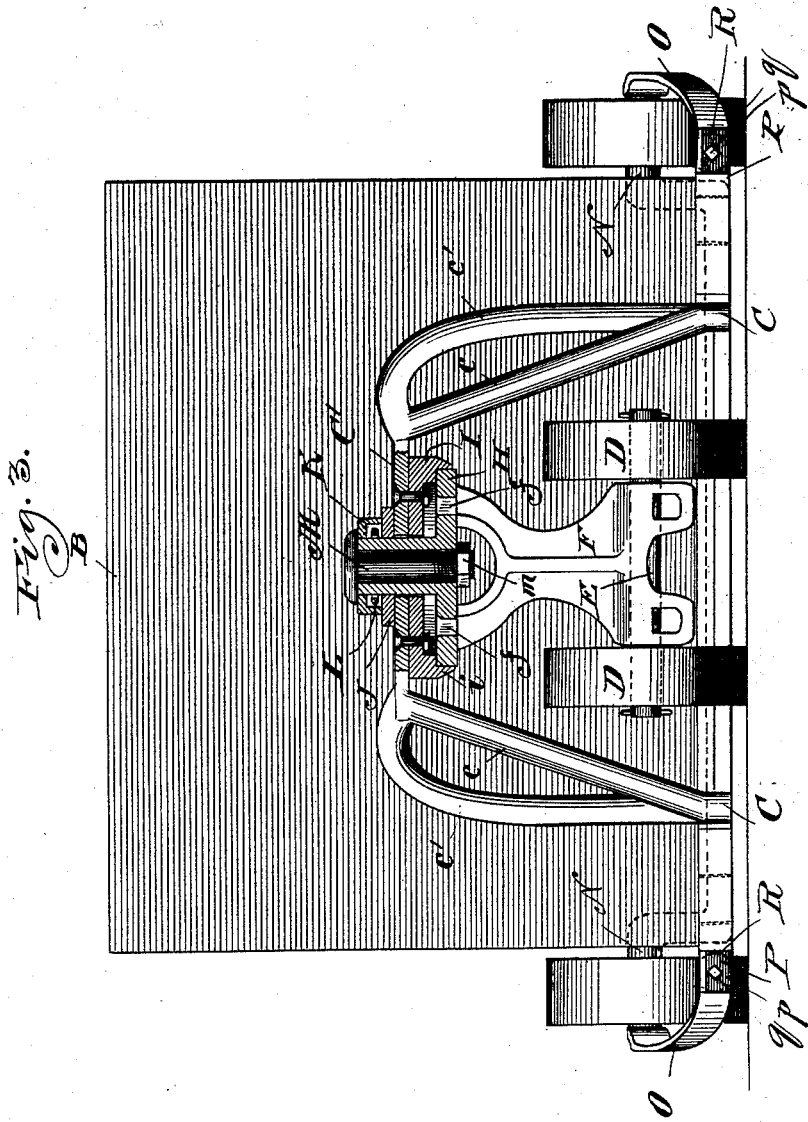

UNITED STATES PATENT OFFICE.

JAMES C. A. DEAN, OF CHICAGO, ILLINOIS, ASSIGNOR OF ONE-HALF TO WILLIAM R. MAHAN, OF SAME PLACE.

TRUCK.

SPECIFICATION forming part of Letters Patent No. 485,262, dated November 1, 1892.

Application filed February 18, 1892. Serial No. 421,932. (No model.)

*To all whom it may concern:*

Be it known that I, JAMES C. A. DEAN, a citizen of the United States, residing at Chicago, Illinois, have invented certain new and useful Improvements in Trucks, of which the following is a specification.

My invention relates to trucks of the class which are commonly used in stores, warehouses, elevators, depots, and freight-houses for handling and transferring boxes, barrels, sacks, bales, and other packages of goods.

The object of my invention is to provide a truck with a low body and large surface to enable the loading of heavy goods with ease and to carry a large bulk of goods, putting it within reach of the operator; also, to provide a truck on which an elevator-load of goods may be placed and the truck speedily run on or off an elevator without the delay commonly caused by the method of loading and unloading an elevator piece by piece with the common two-wheel truck.

The common low door-frames to elevator-shafts in mercantile houses will not permit as large a load as could be often hauled of boxes or light material—such as furniture—to pass underneath; but by the use of the low-body truck a gain of from a foot to fifteen inches in carrying capacity will be made, and at the same time the draft is reduced by using large wheels.

One of the features of my invention consists in means for supporting the forward end of the truck, said means comprising a wheel, (or pair of wheels mounted upon a short axle,) a standard rising from the axle, and supporting-arms connected to and resting upon said standard in such manner as to permit the front wheel or wheels to turn freely, so that the direction of movement of the truck may be changed readily.

Another feature of my invention relates to the manner of supporting the rear end of the truck, which I do by means of a cranked axle having a pair of ground-wheels applied to the journals thereof, and to a novel means of securing the wheels upon said axles, while at the same time forming a guard or fender for said wheels.

Other features of my invention relate to the construction of a combined corner-block and stake-pocket and to the provision of and novel means for supporting rollers at the sides and one end of the truck-body to facilitate the loading and unloading of goods.

The object of the stake-pocket is to make suitable provision for movable side-boards and end-gates, which can be placed around the surface of the truck-body for handling loose material. The truck may have, in addition to said side-boards and end-gate, a hopper or flaring bottom with an aperture in the center of the truck and having a suitable valve or trap for discharging grain, &c., into a pit underneath the truck, thus making a truck of easy management for weighing and storing grain in small grain-elevators where one scale and conveyer are used, making a combination of either a flat or a box truck.

In the accompanying drawings, Figure 1 is a plan view of the truck. Fig. 2 is a side elevation. Fig. 3 is a front elevation, the tongue omitted and the view being partly in vertical section through the turn-table or fifth-wheel construction; and Figs. 4 to 9, inclusive, are detail views of the turn-table or fifth-wheel and connected parts.

In the drawings, A represents the body of the truck, which will usually have the end bar B applied thereto. The forward end of the truck is hung upon the combined support and hanger C, which will preferably be made from malleable or wrought iron or steel and the lower end of which will pass beneath and will be bolted or riveted to the truck-body, while its upper end will be fashioned into an annular flat plate C', and the arms which connect its upper and lower portions will preferably be branched for strength and economy of construction, the bifurcations or branches of these arms being marked c c', respectively.

D D are the forward wheels, which turn freely on the stationary axle E, and the standard F is chambered to receive said axle and is held thereto by the hounds G, which pass through transverse apertures in the lower part of the standard, said hounds being slightly wedge-shaped or tapered and provided with the tightening-nuts g, whereby they may be drawn tightly beneath the axle and thus hold the latter against turning. The hounds may pass through holes in the axle and be held by nuts, or an ordinary branch tongue may be employed, the branches provided with eyes shrunk on the ends of the axle, whereby to secure the wheels in place. The standard F bears thereon or has cast therewith the lower member H of a turn-table, which is provided with a boss $h$, which passes through an aperture in the plate C' of the hanger-support.

As shown in the drawings, the standard F and the turn-table plate H are separately formed, the standard F being provided with the lugs $f$, which enter apertures $h'$ in the fifth-wheel plate H; but for convenience they may be formed integrally. The standard F may be constructed of wrought iron or steel and the axle welded to it, and the standard may be bolted or otherwise secured to the plate H.

I represents the upper member of the turn-table, which is bolted to the plate C' and is recessed on its lower side for the bolt heads or nuts. This plate has the marginal flange $i$, which embraces the edge of the lower member H, and the recesses provided for the bolt-heads above mentioned may be utilized to contain a lubricant. The boss $h$ is squared above the plate C', as clearly shown in Fig. 5, and there is fitted over said squared portion the washer J, having a square aperture therein and a lug or stop $j$ thereon.

K represents a latch, (shown in Fig. 9 in an inverted position,) said latch having an expanded and apertured shank, through which the squared end of the boss $h$ projects, the aperture being of such form that the latch may turn freely on the boss. The base of this latch is chambered out, as clearly shown in Fig. 3 of the drawings, and within the chamber a spring L is confined, one end being secured to the latch and the other to the washer J. The latch K has a lug $k$ thereon, and its front end is hooked to engage the tongue T, the lower end of which is pivotally connected to the hounds G.

M is a king-bolt, the head of which is adapted to clamp the latch K and to rest upon the top of the boss $h$, the body passing through the aperture of the boss and the opposite end being threaded to receive the clamping-nut $m$, whereby the members of the turn-table or fifth-wheel are rotatably secured together.

The construction above described permits the use of front wheels of such size as to make the truck of light draft, while at the same time providing for its being turned in small space and its body to be hung low for convenience in loading and unloading freight.

N represents the rear axle, which is cranked, in order to permit the use of high rear wheels, and the journals are of such length as to receive the wheels and permit the requisite amount of lateral play thereof. The rear wheels are held upon their journals by means of the bars O, which are conveniently made from bar-iron and have their ends inturned and secured to the edge of the body or bed of the truck by lag-bolts. The middles of these bars O bear against the ends of the journals of the rear axle, and thus serve to confine the wheels upon such journals.

P represent corner-pieces, which are provided with the stake-pockets Q and have the lugs $p$, in which are fixed the studs $q$ for the rollers R. I preferably arrange two of these rollers parallel to the sides of the bed and in front of the rear wheels and the third roller at the rear end of the bed. Said rollers may have their rear ends supported in studs passing through the bars O. These corner-pieces therefore serve the several functions of strengthening the corners of the bed, of providing stake-pockets, and furnishing supports for the antifriction-rollers, over which freight may be moved with facility. The bars O also strengthen the bed, serve to support the rollers, hold the wheels upon the axles, and form wheel-guards, although separate devices may be employed for performing some of these functions.

The advantage of having the bed of the truck supported very near to the ground or floor is obvious; but the difficulty has been heretofore to secure this desirable feature in a truck of this character and at the same time provide for turning it in small space and for making it sufficiently strong to withstand the shocks of strains and heavy service.

I claim—

1. In a truck of the class described, the combination, with a low-hung bed or body, of a supporting wheel or wheels for the front end of the truck, a standard to which said wheel or wheels is journaled, a hanger-support connected at its lower end to the front end of the body, a fifth-wheel having one member connected to the upper end of the hanger and the other to the upper end of the standard, and a king-bolt pivotally connecting the members of the fifth-wheel, substantially as described.

2. In a truck of the class described, the combination, with a bed hung low between the rear supporting-wheels, front wheels journaled upon a stationary axle, a standard having a seat in its lower end for the axle and rising from said axle and bearing at its upper end one member of a turn-table or fifth-wheel, a hanger-support the lower end of which passes beneath and is secured to the front end of the bed and the upper end of which carries a fifth-wheel member, and a king-bolt connecting the fifth-wheel members, substantially as described.

3. In a truck of the class described, the combination, with a bed supported below the journal of the ground-wheels, of a hanger-support for the front end of said bed, the front supporting-wheels, a standard rising therefrom, a fifth-wheel device connected with the standard and the support, said standard being longitudinally apertured to receive the axle and transversely apertured to receive the hounds, and means for wedging them beneath the axle, whereby to prevent the rotation of the latter, substantially as described.

4. In a truck, the combination, with the fifth-wheel members, of a king-bolt for coupling said members together, a spring-controlled latch axially mounted with reference to said king-bolt, and stops provided on the fifth-wheel and on the latch, whereby to maintain the latter always in position to receive the tongue, substantially as described.

5. In a truck of the class described, the combination, with a cranked axle for the rear supporting-wheels, of a wheel-guard consisting of a bar having its ends secured with the edge of the truck and its middle adapted to confine the wheels upon the journal, substantially as described.

6. In a truck of the class described, the combination, with the corner-pieces and wheel-guards, of rollers journaled in said corner-pieces and guards parallel to the side margins of the truck-bed, substantially as described.

7. In a truck of the class described, the combination, with corner-pieces provided with stake-pockets and projecting lugs, of a roller journaled parallel to the rear margin or edge of the bed, said journals being mounted in or upon projections of the corner-pieces, substantially as described.

JAMES C. A. DEAN.

Witnesses:
C. C. LINTHICUM,
WM. R. MAHAN.